United States Patent [19]

Drouault et al.

[11] Patent Number: 5,389,935
[45] Date of Patent: Feb. 14, 1995

[54] AUTOMATIC SYSTEM FOR LOCATING AND IDENTIFYING VEHICLES IN DISTRESS

[75] Inventors: Didier Drouault, Eaubonne; Jean Potage, Franconville, both of France

[73] Assignee: Thomson-CSF, Puteaux, France

[21] Appl. No.: 216,367

[22] Filed: Mar. 23, 1994

Related U.S. Application Data

[63] Continuation of Ser. No. 828,852, filed as PCT FP91/00465, Jun. 11, 1991, abandoned.

[30] Foreign Application Priority Data

Jun. 13, 1990 [FR] France ................ 90 07324

[51] Int. Cl.⁶ ............................................ G01S 3/02
[52] U.S. Cl. ............................. 342/457; 340/426
[58] Field of Search ............ 342/357, 457, 465; 340/436, 464, 539; 455/12.1, 13.1, 33.1; 364/449

[56] References Cited

U.S. PATENT DOCUMENTS

| | | |
|---|---|---|
| 3,828,306 | 8/1974 | Angeloni . |
| 4,216,545 | 8/1980 | Flickshu et al. ............ 455/77 |
| 4,596,988 | 6/1986 | Wanka . |
| 4,910,493 | 3/1990 | Chambers et al. ......... 340/426 |
| 4,947,151 | 8/1990 | Rosenberger ............... 340/426 |
| 5,003,317 | 3/1991 | Gray et al. .................. 342/457 |
| 5,055,851 | 10/1991 | Sheffer ........................ 342/457 |
| 5,191,342 | 3/1993 | Alsup et al. ................. 342/465 |

FOREIGN PATENT DOCUMENTS

| | | |
|---|---|---|
| 2203118 | 5/1974 | France . |
| 2757294 | 6/1979 | Germany . |
| 3830301 | 3/1990 | Germany . |
| 2207787 | 2/1989 | United Kingdom . |

*Primary Examiner*—Theodore M. Blum
*Attorney, Agent, or Firm*—Oblon, Spivak, McClelland, Maier & Neustadt

[57] ABSTRACT

The system comprises, on the one hand, a network of radiogoniometers ($4_1 \ldots 4_n$) which are coupled to at least one computer and are arranged at well-determined locations of areas of a region, and on the other hand, a set of radio distress beacons (2) which are arranged inside vehicles (1) moving within the areas of the region. The computer (6) comprises means of processing information emitted by the distress beacons and means of connection for locating and identifying in the region the beacons emitting distress signals and for transmitting the corresponding information to the emergency services (9) closest to the places of emission by the beacons.

18 Claims, 3 Drawing Sheets

AUTOMATIC SYSTEM FOR LOCATING AND IDENTIFYING VEHICLES IN DISTRESS

This application is a continuation of application Ser. No. 07/828,852, filed as PCT/FR 91/00465, Jun. 11, 1991, now abandoned.

BACKGROUND OF THE INVENTION

FIELD OF THE INVENTION

The present invention relates to an automatic system for locating and identifying vehicles in distress.

DISCUSSION OF THE BACKGROUND

The dispatch time of emergency services to places of road traffic accidents depends on the speed with which the latter are alerted and on the effective distance existing between the place of the incident and the nearest emergency station.

Thus the effectiveness of rescue operations is directly related to the infrastructure and to the human and hardware means at the disposal of the rescuers in order to cover a region, and the period which elapses between the incident and the alarm is mainly related to the place of the accident, to its nature and to the possible witnesses who may take up this alarm.

SUMMARY OF THE INVENTION

In order to minimise to the maximum the time which elapses between the accident and the alarm, the aim of the invention is to permit the automatic detection of serious accidents which may occur within the field in particular of road traffic in a specified region.

To this end, the subject of the invention is an automatic system for locating and identifying vehicles in distress, characterised in that it comprises, on the one hand, a network of radiogoniometers which are coupled to at least one computer and are arranged at well determined locations of areas of a region, and on the other hand, a set of radio distress beacons which are arranged inside vehicles moving within the areas of the region, and in that the computer comprises means of processing information emitted by the distress beacons and means of connection for locating and identifying in the region the beacons emitting distress signals and for transmitting the corresponding information to the emergency services closest to the places of emission by the beacons.

BRIEF DESCRIPTION OF THE DRAWINGS

Other characteristics and advantages of the invention will emerge below in the description which follows, given with reference to the attached drawings which represent.

DESCRIPTION OF THE PREFERRED EMBODIMENTS

Figure 1:
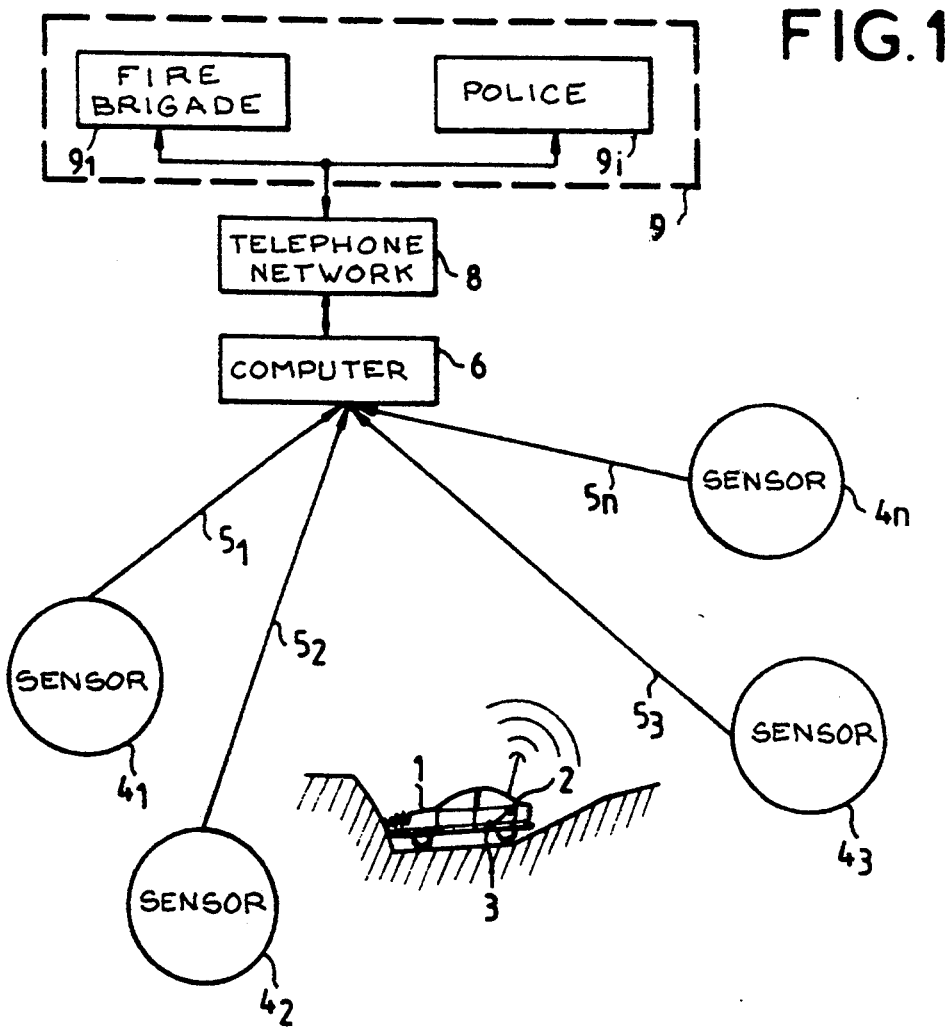
FIG. 1, a system for locating and identifying vehicles in distress according to the invention.

According to the invention each vehicle bearing the reference 1 in FIG. 1 is equipped with a distress beacon 2. It furthermore possesses sensors 3 enabling it to establish electrical or mechanical contact following a significant impact suffered by the vehicle, in respect of which it is assumed that the occupants of the vehicle are injured. The contact established by each sensor 3 enables the distress beacon 2 to start emitting on a specified radio frequency. A ground infrastructure consisting in FIG. 1 of radiogoniometers referenced from $4_1$ to $4_n$ permits reception and detection of this radio emission. Each sensor $4_1$ to $4_n$ possesses a goniometer coupled to a specific computer, not shown, which makes it possible to acknowledge in known manner on the basis of a chart the logging of the signal received.

A computer link $5_1 \ldots 5_n$ connects all the sensors $4_1$ to $4_n$ to a processing unit 6 which receives all the logging information and deduces therefrom the exact coordinates of the point of emission. Such a link may for example be constructed in the manner of that known and described in the report 668-2 of the Commission of Study No. 1 CCIR of the ITU of October 89 entitled "Automatic monitoring and measurement of the radio frequency spectrum". The computer 6 placed in a listening and alarm centre, not shown, makes it possible to generate a call on the switched telephone network to an emergency centre 9 which is the closest to the place of the accident, and to supply the calculated geographical coordinates of the position of the vehicle involved in an accident.

Figure 2:
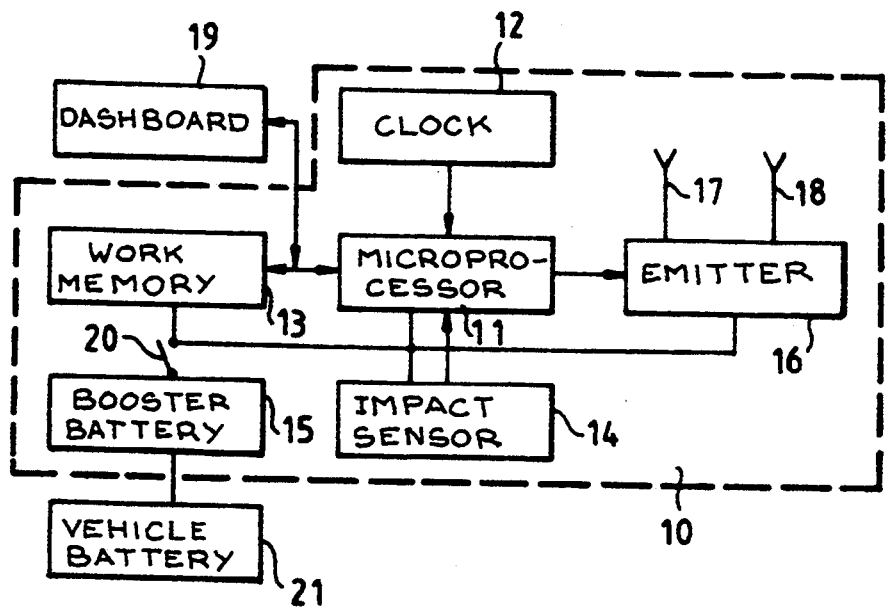
FIG. 2, an embodiment of an electronic device arranged inside each beacon in order to permit the emission of distress signals.
Figure 3:
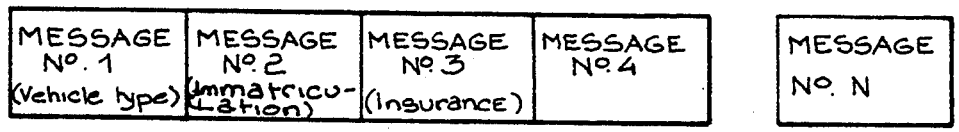
FIG. 3, a sequence of types of messages capable of being transmitted by the beacons.
Figure 4:
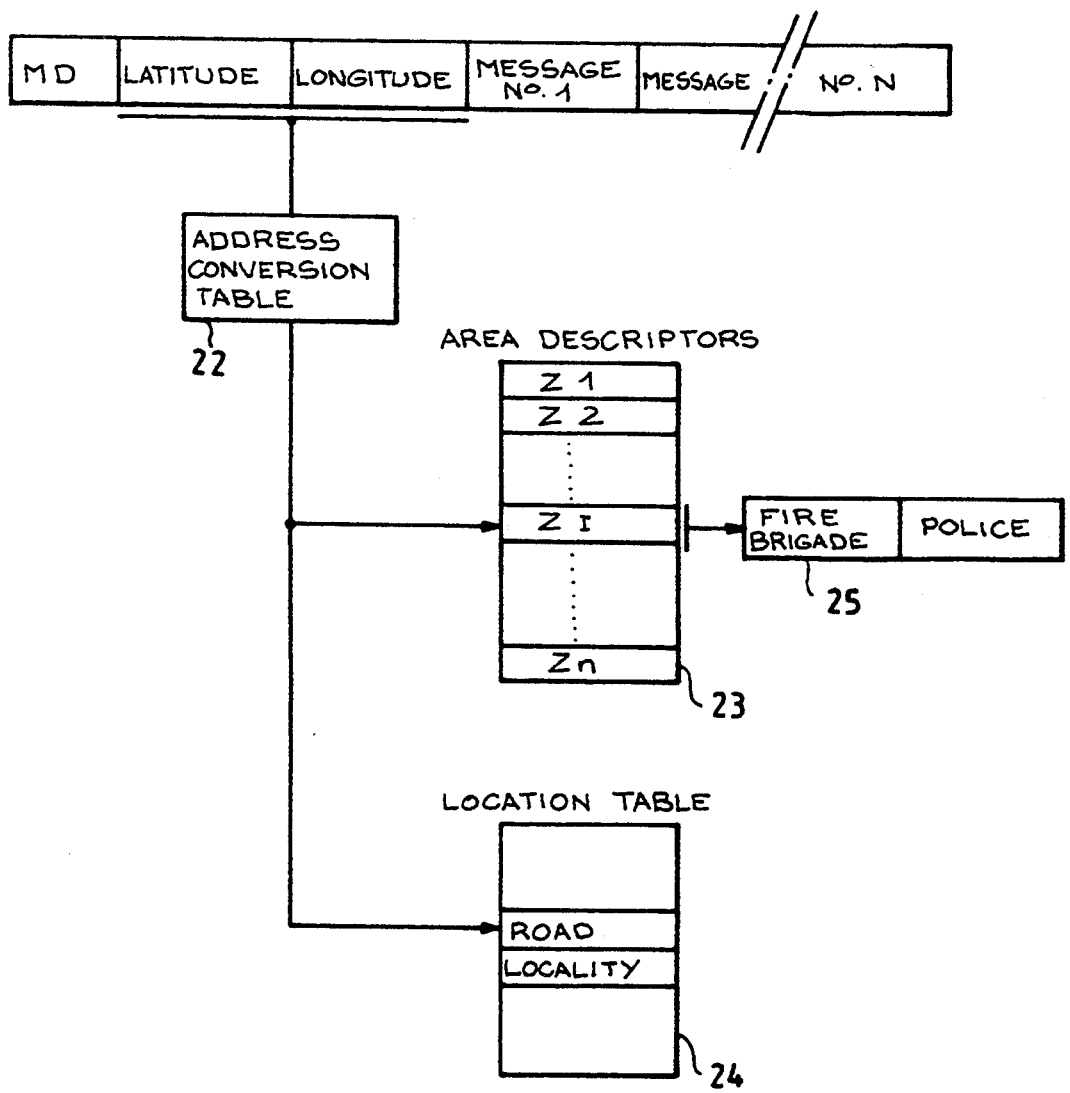
FIG. 4, an area descriptor addressing diagram.

The electronic device equipping the distress beacon 2 is represented diagrammatically in FIG. 2 inside a closed dashed line 10. It comprises, connected to a microprocessor 11, a clock 12, a memory 13, an impact sensor 14, a booster battery 15 and a radio emitter 16 which are coupled to at least two antennas 17 and 18 situated above and below the vehicle 1 in order to permit continuity of the emissions from the beacon even in the event that the vehicle turns round or turns over. The microprocessor 11 is connected to the dashboard 19 of the vehicle. A switch 20 is placed on the beacon to permit the cutting of power to the device of FIG. 2 via the booster battery 15. The booster battery 15 is moreover powered by the vehicle battery 21. According to a first embodiment of the invention, the emitter 16 can emit on two different frequencies, each of which may have a particular significance in order to enable the appropriate emergency services, such as the fire brigade, hospital services personnel and mechanical breakdown teams for removing the vehicle, to be moved to the site of the vehicle involved in an accident. The types of messages which are transmitted are messages which convey information about the type of vehicle involved in an accident, about its registration, about its insurance, possibly about the dealer's garage, etc. A test message may possibly be provided to permit testing of the correct operation of the beacon, without however triggering the emergency services. The frequencies and the messages transmitted over these channels are detected by the goniometers $4_1$ to $4_n$ and the angles of arrival of these frequencies are transmitted with the corresponding messages to the computer 6 which effects location of the vehicle 1. This location is determined in a known manner in latitude and longitude relative to the Greenwich meridian, for example, which enables, in the manner represented in FIG. 4, the geographical area in which the vehicle involved in an accident is situated to be defined with the aid of a conversion table 22. To determine a location, the conversion table calculates an area address in an area descriptor table stored in a memory of the computer 6 and an address for addressing a location table. The area $z_i$ pointed to by the address conversion table 22 contains, in the manner represented at 25 in FIG. 4, all the information required for the rapid dispatch of the emergency means to the place of the accident. This information may consist, as represented in FIG. 4, of the telephone numbers of the fire brigade or police services closest to the place at which the accident took place. The address conversion table 22 also points, in the location/table 24, to the locality of the place closest to the accident, and the road on which it occurred. The computer 6 may thus deduce therefrom the number of kilometers separating the place of the accident from the locality.

Figure 5:
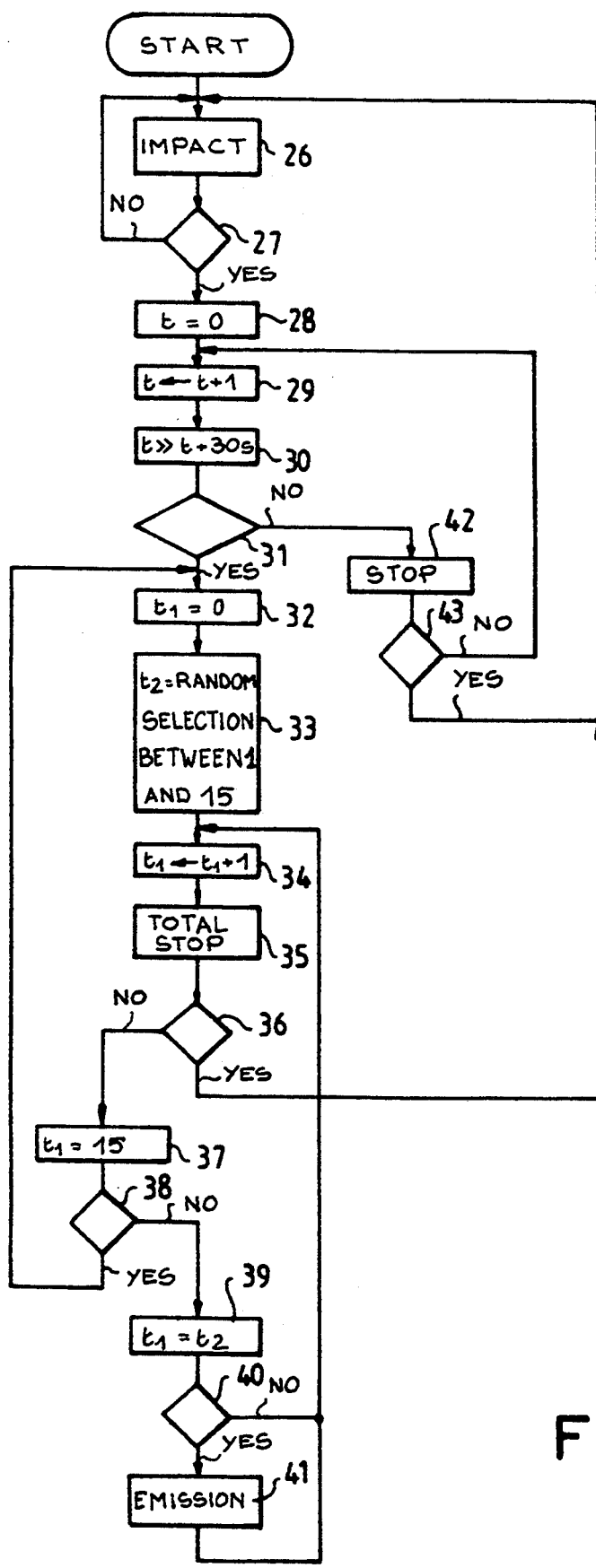
FIG. 5, a flow diagram to illustrate a mode of programming the beacon.

The operation of a beacon is illustrated by steps 26 to 43 of the flow diagram of FIG. 5. In this flow diagram when, in steps 26 and 27, an impact is detected, a time delay of specified duration, 30 seconds for example, and illustrated by steps 28 to 31 and 42, 43, is triggered by the impact sensors 14 of the beacon in such a way as to enable the occupants of the vehicle to act on the dashboard 19 in order possibly to prevent the emissions of messages if it is noted that the impact which caused the triggering of the beacon does not justify the sending of distress signals. If at step 42 the stopping of the operation of the beacon is not carried out at the end of the 30 seconds elapsed, the microprocessor 11 executes steps 32 to 41 which permit messages to be sent regularly inside windows of specified duration $t_0$ of 15 seconds for example, with emission slot of duration $t_1$ of 1 second for example selected randomly inside each window of duration $t_0$, so as to preclude two colliding vehicles, each having a beacon, being able to have a simultaneous emission cycle. At step 35 it is possible to stop the operation of the beacon by cutting the power to the latter through action on the switch 20. If this action is not carried out at step 35 the emission procedure is continued through execution of steps 37 to 41.

Naturally, according to the invention it is also possible to equip emergency vehicles with goniometers matched to the frequency range of the distress beacons. The attraction of this equipment is of course to be able to indicate to the driver of the emergency vehicle the general direction to be followed in order to reach the place of the accident. This solution is attractive in particular in the case of a vehicle involved in a night-time accident in a rural area for example.

We claim:

1. A system for locating vehicles in distress, comprising:

a radio distress beacon having at least one input sensor connected to a vehicle which transmits a distress signal upon a predetermined condition;

a network of direction finders which receive the distress signal, each of the direction finders determining an angle of arrival of the distress signal;

a computer, coupled to each of the direction finders and to a switched telephone network connected to emergency services, for calculating a location of the vehicle using the angle of arrival of the distress signal determined by each of the direction finders;

means for determining from the location calculated by the computer, a telephone number of emergency services which are closest to the location of the vehicle and a geographical area in which the predetermined condition occurred; and means for automatically calling the closest emergency services and indicating a direction to be followed to reach the location where the predetermined condition occurred.

2. A system according to claim 1, wherein the geographical area in which the vehicle in distress is located is defined by conversion tables addressed from the calculated location of the vehicle, said conversion tables pointing on area descriptor tables indicating the telephone numbers of the closest emergency services and pointing on a location table for indicating a road and a locality where the predetermined condition occurred.

3. A system according to claim 2, wherein the radio distress beacon transmits on at least two different frequencies.

4. A method according to claim 3, wherein the radio distress beacon is controlled by a microprocessor coupled to the at least one impact sensor.

5. A system according to claim 4, wherein the radio distress beacon transmits under the control of the microprocessor messages which identify the vehicle after the vehicle has been involved in an accident.

6. A system according to claim 5, wherein at least one of a transmitter of the radio distress beacon and the microprocessor are powered by a booster battery connected to a vehicle battery.

7. A system according to claim 6, wherein the microprocessor is connected to a switch means on a dashboard of the vehicle such that a user can select one of the messages to be transmitted which indicates a nature of services which are requested.

8. A system according to claim 7, wherein the radio distress beacon includes a switch for cutting electrical power to at least one of the transmitter and the microprocessor.

9. A system according to claim 8, wherein the microprocessor is programmed to trigger at least one of the transmission of frequencies and distress messages by the transmitter when an impact is detected by the impact sensor.

10. A system according to claim 9, wherein the microprocessor defers the transmission for a specified duration after an impact is detected so that the radio distress beacon can be prevented from transmitting by a passenger of the vehicle.

11. A system according to claim 10, wherein the transmitter transmits a message every predetermined duration after a determination of an impact by the impact sensor.

12. A system according to claim 11, wherein the transmitter transmits at a random time for a predetermined duration after occurrence of the predetermined condition.

13. A system according to claim 12, wherein a prevention of transmission occurs when there is an action on at least one of a prevention switch on the dashboard and a power switch of the radio distress beacon.

14. A system according to claim 13, wherein the transmitter is connected to at least two antennas on the vehicle.

15. A system according to claim 1, wherein the radio distress beacon comprises:

means for delaying a transmission of the distress signal;

means for a user to inhibit a transmission of the distress signal;

wherein the predetermined condition upon which the radio distress beacon transmits the distress signal is an impact of the vehicle detected by the impact sensor and the user does not inhibit the transmission of the distress signal.

16. A system according to claim 1, wherein the radio distress beacon transmits the distress signal during a randomly selected time window upon occurrence of the predetermined condition.

17. A system for locating vehicles in distress, comprising:

an input sensor, located within a vehicle, for inputting a predetermined condition;

a radio distress beacon, connected to the input sensor, for transmitting a distress signal when the input sensor inputs the predetermined condition;

a network of direction finders which receive the distress signal;

means for calculating a location of the vehicle, connected to the network of direction finders, for calculating a location of the vehicle using the distress signal received by the network of direction finders;

telephone number determining means, connected to the means for calculating a location of the vehicle, for determining a telephone number of emergency services which are available to the vehicle at the calculated location of the vehicle; and means for automatically calling the emergency services and indicating the location of the vehicle.

18. A system according to claim 17, wherein:

the means for calculating the location calculates the latitude and longitude of the vehicle;

the system further comprising:

means for determining a geographical area of the vehicle using the calculated latitude and longitude;

wherein the means for automatically calling indicates the determined geographic area.

* * * * *